(12) United States Patent
Sasaki et al.

(10) Patent No.: US 12,716,551 B2
(45) Date of Patent: Aug. 25, 2026

(54) FUEL SUPPLY SYSTEM FOR HYDROGEN AIRCRAFT, AND TANK INTERNAL PRESSURE ADJUSTMENT METHOD

(71) Applicant: KAWASAKI JUKOGYO KABUSHIKI KAISHA, Kobe (JP)

(72) Inventors: Koichi Sasaki, Kobe (JP); Shigenori Yasuda, Kobe (JP); Kazunari Tsuru, Kobe (JP); Shota Tanaka, Kobe (JP); Kazuko Shimizu, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 227 days.

(21) Appl. No.: 18/641,463

(22) Filed: Apr. 22, 2024

(65) Prior Publication Data

US 2024/0263745 A1 Aug. 8, 2024

Related U.S. Application Data

(63) Continuation of application No. PCT/JP2022/040470, filed on Oct. 28, 2022.

(30) Foreign Application Priority Data

Oct. 29, 2021 (JP) ................................ 2021-177444

(51) Int. Cl.
*F17C 7/02* (2006.01)
*B64D 37/00* (2006.01)
*B64D 37/30* (2006.01)

(52) U.S. Cl.
CPC ............. *F17C 7/02* (2013.01); *B64D 37/005* (2013.01); *B64D 37/30* (2013.01);
(Continued)

(58) Field of Classification Search
CPC ...... B64D 37/005; B64D 37/04; B64D 37/10; B64D 37/30; F17C 2201/0109;
(Continued)

(56) References Cited

U.S. PATENT DOCUMENTS 7,281,681 B2 * 10/2007 MacCready ............. B64C 3/10 244/59
7,806,365 B2 * 10/2010 Miller .................... B64D 37/30 244/135 R (Continued)

FOREIGN PATENT DOCUMENTS

CA 3132724 A1 9/2020
JP 2016-510376 A 4/2016

*Primary Examiner* — Filip Zec
(74) *Attorney, Agent, or Firm* — XSENSUS LLP

(57) ABSTRACT

A fuel supply system (1) for a hydrogen-powered aircraft includes: a fuel tank (2) that stores liquefied hydrogen; a pump (5) that discharges the liquefied hydrogen from the fuel tank (2) to supply the liquefied hydrogen to a propulsion device (102); a pressure increasing mechanism (3) that increases a tank internal pressure being a pressure in an inner part of the fuel tank (2); a flow rate controller (71) that controls a flow rate of the liquefied hydrogen to be supplied from the fuel tank (2) to the propulsion device (102); and a pressure controller (73) that controls, on the basis of information which is about the flow rate of the liquefied hydrogen and is input from the flow rate controller (71), the pressure increasing mechanism (3) to adjust the tank internal pressure.

19 Claims, 5 Drawing Sheets

(52) U.S. Cl.
CPC ........................... *F17C 2201/0109* (2013.01); *F17C 2221/012* (2013.01); *F17C 2223/0161* (2013.01); *F17C 2227/0135* (2013.01); *F17C 2227/0304* (2013.01); *F17C 2227/0374* (2013.01); *F17C 2250/043* (2013.01); *F17C 2250/0439* (2013.01); *F17C 2250/0626* (2013.01); *F17C 2250/0636* (2013.01); *F17C 2265/066* (2013.01); *F17C 2270/0189* (2013.01)

(58) Field of Classification Search
CPC ........ F17C 2221/012; F17C 2223/0161; F17C 2227/0135; F17C 2227/0304; F17C 2227/0374; F17C 2250/043; F17C 2250/0439; F17C 2250/0626; F17C 2250/0636; F17C 2265/066; F17C 2270/0189; F17C 7/02
See application file for complete search history.

(56) References Cited

U.S. PATENT DOCUMENTS 9,255,664 B2 * 2/2016 Gerstler ................ B64D 37/00
11,668,243 B2 * 6/2023 Muldoon ............... B64D 37/04
60/736
12,078,108 B2 * 9/2024 Minas ....................... F02C 3/22
12,092,042 B2 * 9/2024 Minas .................... B64D 37/30
12,129,044 B2 * 10/2024 Tejpal .................... B64D 37/30
12,162,626 B2 * 12/2024 Wankewycz ........... B64D 37/14
12,351,337 B2 * 7/2025 Minas ....................... B64F 1/28
12,358,640 B2 * 7/2025 Kawai ....................... F17C 1/12
12,473,862 B2 * 11/2025 Miller .................... B64D 37/30
12,617,546 B2 * 5/2026 Gilmore ................ B64D 37/04
2014/0174106 A1 6/2014 Tang et al.
2015/0344144 A1 12/2015 Kamath et al.
2020/0088098 A1 3/2020 Roberge
2020/0340403 A1 * 10/2020 Bartosz .................. B64D 41/00
2021/0009280 A1 * 1/2021 Poirier .................... B60L 50/70
2021/0020966 A1 * 1/2021 Yamaue ............ H01M 8/04074
2021/0102492 A1 * 4/2021 Rambo ................... F02C 7/185
2021/0111419 A1 * 4/2021 Itou ................... H01M 8/04029
2021/0340908 A1 * 11/2021 Boucher ................. F02C 7/224
2022/0146047 A1 5/2022 Bensadoun et al.
2022/0163170 A1 5/2022 Bensadoun et al.
2022/0227497 A1 7/2022 Dean
2022/0250762 A1 * 8/2022 Sperrin .................. B64D 37/30
2022/0306310 A1 * 9/2022 Sibbach .................... F02C 3/22
2023/0213279 A1 * 7/2023 Little ..................... F25J 1/0202
62/643
2023/0375136 A1 * 11/2023 Orchard .................... F17C 7/04
2024/0409232 A1 * 12/2024 Takai ........................ F02C 7/16

* cited by examiner

FUEL SUPPLY SYSTEM FOR HYDROGEN AIRCRAFT, AND TANK INTERNAL PRESSURE ADJUSTMENT METHOD

CROSS-REFERENCE TO RELATED APPLICATIONS

The present application claims priority to PCT/JP2022/040470 filed Oct. 28, 2022, and JP 2021-177444 filed Oct. 29, 2021, both of which are incorporated herein by reference.

FIELD OF INVENTION

The present disclosure relates to a fuel supply system and a method of adjusting a tank internal pressure for a hydrogen-powered aircraft that uses hydrogen as an energy source or a fuel of a propulsive force.

BACKGROUND ART

There is known a hydrogen-powered aircraft including a propulsion device that uses a hydrogen-gas turbine engine or a fuel cell system, and a fuel tank that stores hydrogen as a fuel to be supplied to the propulsion device.

SUMMARY

A system according to one aspect of the present disclosure is a fuel supply system for a hydrogen-powered aircraft including a propulsion device that uses hydrogen as an energy source. The fuel supply system includes: a fuel tank that stores liquefied hydrogen; a pump that discharges the liquefied hydrogen from the fuel tank to supply the liquefied hydrogen to the propulsion device; a pressure increasing mechanism that increases a tank internal pressure being a pressure in an inner part of the fuel tank; a flow rate controller that controls a flow rate of the liquefied hydrogen to be supplied from the fuel tank to the propulsion device; and a pressure controller that controls, on the basis of information which is about the flow rate of the liquefied hydrogen and is input from the flow rate controller, the pressure increasing mechanism to adjust the tank internal pressure.

A method according to another aspect of the present disclosure is a method of adjusting a tank internal pressure for a hydrogen-powered aircraft which includes: a propulsion device that uses hydrogen as an energy source; a fuel tank that stores liquefied hydrogen; a pump that discharges the liquefied hydrogen from the fuel tank to supply the liquefied hydrogen to the propulsion device; a pressure increasing mechanism that increases a tank internal pressure being a pressure in an inner part of the fuel tank; and a manipulation device that receives a manipulation to the hydrogen-powered aircraft. The method includes controlling the pressure increasing mechanism to adjust the tank internal pressure on the basis of any information of information about an output of the propulsion device, information about a flow rate of the liquefied hydrogen discharged from the fuel tank to the propulsion device, and information about the manipulation to the manipulation device.

DETAILED DESCRIPTION

First Embodiment

1. Fuel Supply System

Figure 1:
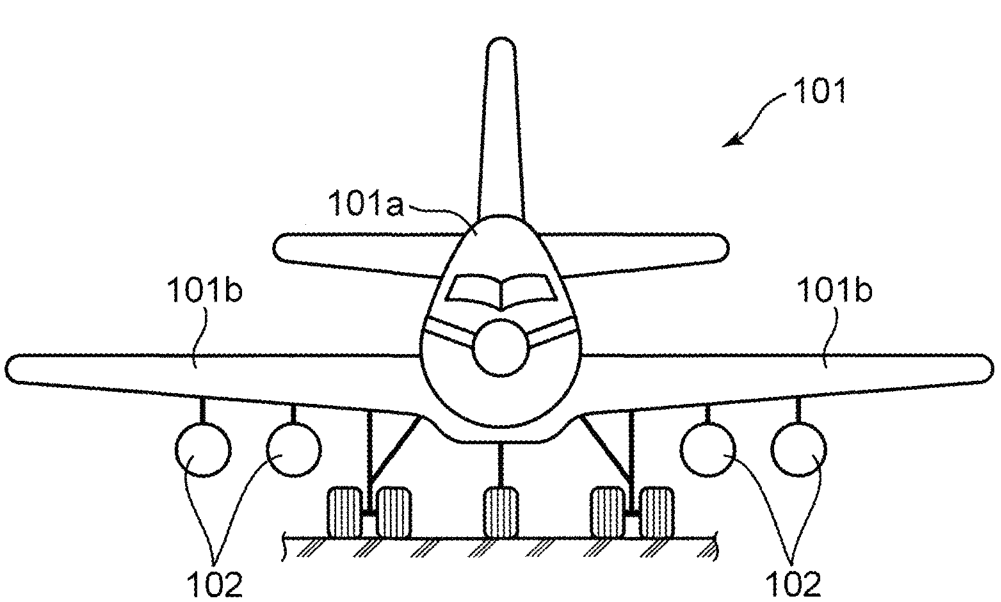
FIG. 1 is a front view of a schematic configuration of a hydrogen-powered aircraft to which a fuel supply system according to a first embodiment of the present disclosure is applied.
Figure 2:
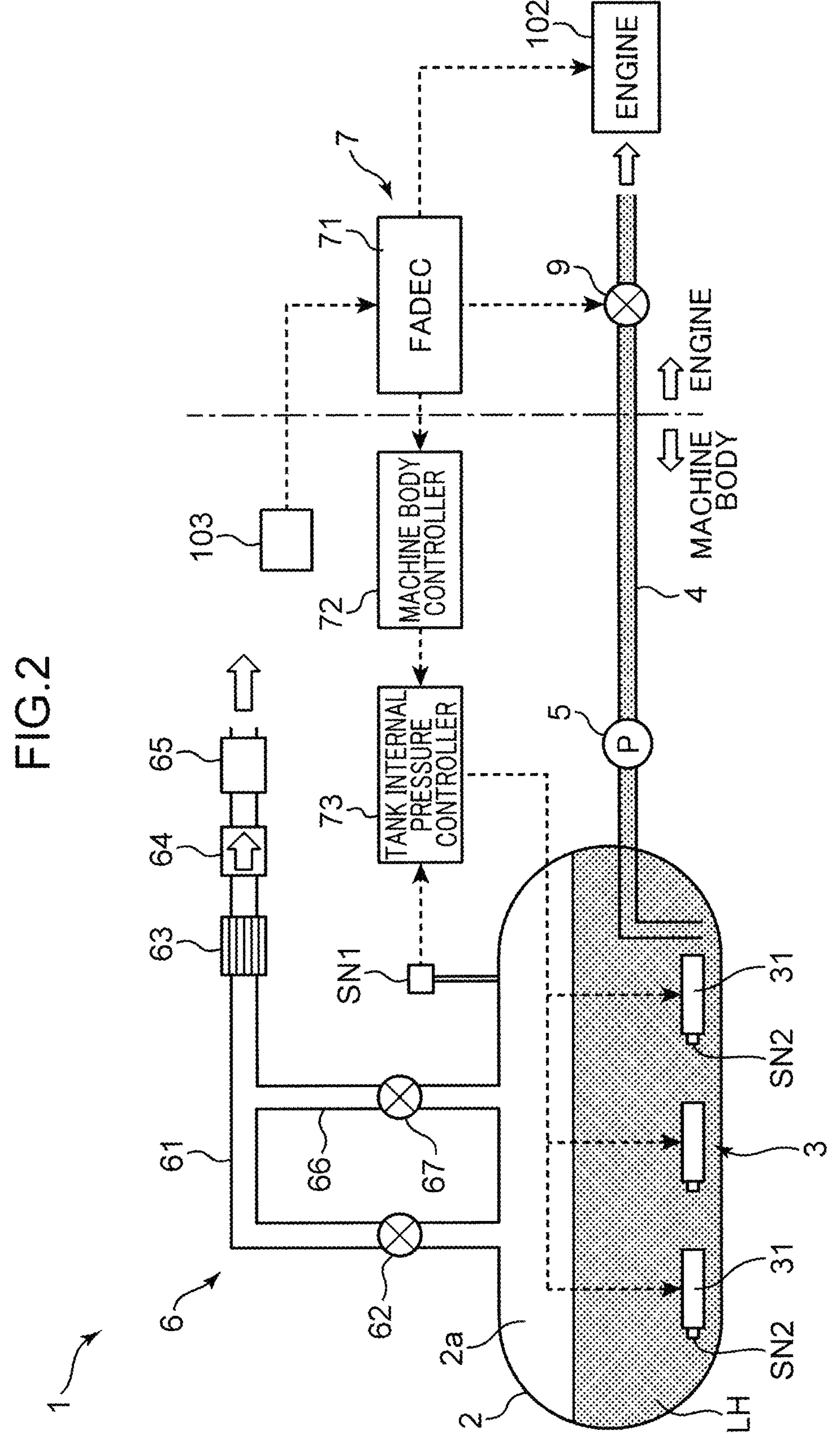
FIG. 2 is a system diagram showing a schematic configuration of the fuel supply system.

FIG. 1 is a front view of a schematic configuration of a hydrogen-powered aircraft to which a fuel supply system 1 according to a first embodiment of the present disclosure is applied. The fuel supply system 1 is shown in FIG. 2. The hydrogen-powered aircraft illustrated in the drawing is an aircraft that uses hydrogen as an energy source or a fuel of a propulsive force, and includes a machine body 101 and engines 102, i.e., propulsion device, attached to the machine body 101. The machine body 101 has a fuselage 101*a* and a pair of wings 101*b* respectively attached to left and right portions of the fuselage 101*a*. The engines 102 are attached to each of the wings 101*b*. Each of the engines 102 is a hydrogen turbine engine including a gas turbine driven to rotate with hydrogen combustion energy.

FIG. 2 is a system diagram showing a schematic configuration of the fuel supply system 1. The fuel supply system 1 shown in the drawing supplies hydrogen as a fuel to each engine 102 and is provided in the machine body 101. The fuel supply system 1 includes a fuel tank 2, a pressure increasing mechanism 3, a fuel supply pipe 4, a pump 5, a pressure limiting mechanism 6, and a controller 7.

The fuel tank 2 is a container that stores liquefied hydrogen LH being cryogenic liquefied hydrogen. The fuel tank 2 has thermal insulation and pressure resistance to store the liquefied hydrogen LH therein while keeping the coolness and the pressure of the hydrogen. The fuel tank 2 is made of metal, such as aluminum, or formed of a composite member including CFRP, GFRP, or the like. The fuel tank 2 shown in FIG. 2 has opposite ends each having a hemispherical shape and an intermediate portion having a cylindrical shape. However, the shape is not limited thereto as long as the shape is suitable for maintaining a high pressure.

The fuel tank 2 has a gaseous phase 2*a* on the liquefied hydrogen LH in an inner part of the tank. The gaseous phase 2*a* represents a space occupied by hydrogen gas including boil-off gas (BOG) resulting from evaporation of the liquefied hydrogen LH by heating. A pressure sensor SN1 that detects a tank internal pressure being a pressure in the gaseous phase 2*a* is attached to the fuel tank 2.

The pressure increasing mechanism 3 increases the tank internal pressure. In the embodiment, the pressure increasing mechanism 3 includes heaters 31 arranged in the fuel tank 2. The heaters 31 are arranged apart from each other near the bottom of the fuel tank 2. The heaters 31 in this arrangement are likely to be immersed in the liquefied hydrogen LH in the fuel tank 2.

The temperature of each heater 31 rises by a supply of electric power from, for example, an external power source to heat the liquefied hydrogen LH. Heating the liquefied hydrogen LH by the heater 31 encourages the liquefied hydrogen LH to evaporate or vaporize and increase the tank internal pressure. Specifically, the encouragement of the evaporation of the liquefied hydrogen LH owing to the heating by the heater 31 leads to an increase in the amount of gas, i.e., hydrogen gas, in the gaseous phase 2*a* in the fuel tank 2 and an increase in the pressure, i.e., the tank internal pressure, in the gaseous phase 2*a*. In this manner, the pressure increasing mechanism 3 increases the tank internal pressure by the heating and the encouraged evaporation of the liquefied hydrogen LH.

The heaters 31 are respectively provided with temperature sensors SN2 attached thereto. Each of the temperature sensors SN2 detects the temperature of the associated heater 31. Each of the temperature sensors SN2 is provided to determine an existence or absence of a heat abnormality indicating an abnormal temperature rise in the heater 31.

The fuel supply pipe 4 connects the fuel tank 2 and the engine 102 to each other. The liquefied hydrogen LH in the fuel tank 2 is supplied to the engine 102 through the fuel supply pipe 4. The fuel supply pipe 4 has one end in the fuel tank 2 and another end connected to the engine 102. The one end of the fuel supply pipe 4 extends to a position near the bottom of the fuel tank 2.

The pump 5 is an electric pump. The pump 5 sends out the liquefied hydrogen LH in the fuel tank 2 to the engine 102 through the fuel supply pipe 4. The pump 5 is provided at a certain position in the fuel supply pipe 4 and outside the fuel tank 2. The pump 5 sucks out the liquefied hydrogen LH in the fuel tank 2 to the outside and discharges the sucked liquefied hydrogen LH to the engine 102 which is at a downstream position. The pump 5 is not limited to the electric one and may be, for example, a mechanical pump using an axial force of the engine 102.

A flow rate regulating valve 9 is provided at a downstream position of the pump 5 in the fuel supply pipe 4. The flow rate regulating valve 9 is an electric valve. The flow rate regulating valve 9 regulates a flow rate of the liquefied hydrogen LH to be supplied to the engine 102 through the fuel supply pipe 4.

The pressure limiting mechanism 6 limits a pressure to avoid an excessive increase in the tank internal pressure. The pressure limiting mechanism 6 includes a vent pipe 61, an internal pressure control valve 62, a flame arrester 63, a check valve 64, a vent heater 65, a branch pipe 66, and an emergency relief valve 67.

The vent pipe 61 is connected to an upper portion of the fuel tank 2. The vent pipe 61 makes the gaseous phase 2*a* in the fuel tank 2 and outside air communicate with each other.

The internal pressure control valve 62 opens when the tank internal pressure being a pressure in the gaseous phase 2*a* exceeds a predetermined upper limit value. The internal pressure control valve 62 is provided at a certain position in the vent pipe 61. The internal pressure control valve 62 may be of either a mechanical type or an electric type. The hydrogen gas flows out of the gaseous phase 2*a* in the fuel tank 2 to the outside air through the vent pipe 61 in response to the opening of the internal pressure control valve 62. In this manner, the tank internal pressure is limited to the upper limit value or lower.

The flame arrester 63 is a device that prevents flame or backfire from progressing to an upstream position. The flame arrester 63 is provided at a downstream position of the internal pressure control valve 62 in the vent pipe 61. The flame arrester 63 is prepared for a countermeasure against a fire or other incident which may occur outside the fuel tank 2.

The check valve 64 regulates a flow direction of gas passing in the vent pipe 61 to one direction. The check valve 64 is arranged at a downstream position of the flame arrester 63 in the vent pipe 61. Specifically, the check valve 64 permits the hydrogen gas to flow out of the inner part, i.e., the gaseous phase 2*a*, of the fuel tank 2 to the outside air through the vent pipe 61. Also, the check valve 64 prohibits gas from flowing from the outside air into the inner part of the fuel tank 2 through the vent pipe 61.

The vent heater 65 heats the hydrogen gas to flow out through the vent pipe 61. The vent heater 65 is located at a downstream end of the vent pipe 61. The vent heater 65 is provided to prevent the hydrogen gas from flowing out to the outside air while maintaining a cryogenic temperature.

The branch pipe 66 connects a certain portion of the vent pipe 61 and the fuel tank 2 to each other. Specifically, the branch pipe 66 connects a portion between the internal pressure control valve 62 and the flame arrester 63 in the vent pipe 61 and the upper portion of the fuel tank 2 to each other. However, the branch pipe 66 is not indispensably required to connect the certain portion of the vent pipe 61 and the fuel tank 2 to each other. For instance, a pipe corresponding to the branch pipe 66 and extending from the fuel tank 2 may be connected to another flame arrester which is different from the flame arrester 63 to communicate with the outside.

The emergency relief valve 67 opens when the tank internal pressure exceeds a predetermined abnormal value. The emergency relief valve 67 is provided at a certain position in the branch pipe 66. The emergency relief valve 67 may be of either a mechanical type or an electric type. A pressure having an abnormality value at which the emergency relief valve 67 opens is higher than the pressure having the upper limit value at which the internal pressure control valve 62 opens. The emergency relief valve 67 serves as a backup when the internal pressure control valve 62 fails to normally operate.

The controller 7 totally controls each part of the fuel supply system 1. The controller 7 includes a full authority digital engine control (FADEC) 71, a machine body controller 72, and a tank internal pressure controller 73. The FADEC 71 mainly controls the engine 102. The machine body controller 72 mainly controls the machine body 101. The tank internal pressure controller 73 controls the tank internal pressure being a pressure in the inner part, i.e., the gaseous phase 2*a*, of the fuel tank 2. Each of the FADEC 71, the machine body controller 72, and the tank internal pressure controller 73 includes a processor and a memory. A whole of or a part of the FADEC 71, the machine body controller 72, and the tank internal pressure controller 73 may use a common processor or a common memory. The FADEC 71 corresponds to the "flow rate controller" in the disclosure, and the tank internal pressure controller 73 corresponds to the "pressure controller" in the disclosure.

The FADEC 71 is signally connected to the engine 102 and the flow rate regulating valve 9. The FADEC 71 controls each control element in the engine 102 in such a manner that an output of the engine 102 has an appropriate value satisfying an operation condition. Also, The FADEC 71 controls an opening degree of the flow rate regulating valve 9 in such a manner that a flow rate of the liquefied hydrogen LH to be supplied to the engine 102 has an appropriate value satisfying the operation condition.

The FADEC 71 is further signally connected to a manipulation device 103 provided in a cockpit of the machine body 101. The manipulation device 103 includes, for example, a control stick for manipulating a posture of the machine body 101 and a power lever for controlling the output of the engine 102. The FADEC 71 sequentially receives an input of a signal containing a manipulation amount of each of the control stick and the power lever one by one as a manipulation signal.

The tank internal pressure controller 73 is electrically connected to each heater 31 in the fuel tank 2. The tank internal pressure controller 73 controls an electric supply to each heater 31 so that the tank internal pressure falls within a predetermined range.

Besides, the tank internal pressure controller 73 is electrically connected to the pressure sensor SN1 and each temperature sensor SN2. The tank internal pressure controller 73 sequentially receives information about the tank internal pressure detected by the pressure sensor SN1 and sequentially receives information about the temperature of the heater 31 detected by the temperature sensor SN2.

2. Control of Tank Internal Pressure

Next, controlling by the tank internal pressure controller 73 will be described in detail. In the embodiment, two kinds of controls, i.e., a first control and a second control, are prepared for controlling the tank internal pressure by the tank internal pressure controller 73. The first control includes activating each heater 31 on the basis of input information from the FADEC 71. The second control includes activating the heater 31 on the basis of input information from the pressure sensor SN1. The first control is a primary control ensured to be executed in operation of the engine 102. The second control is a preliminary control for a possible failure in working of the first control.

Figure 3:
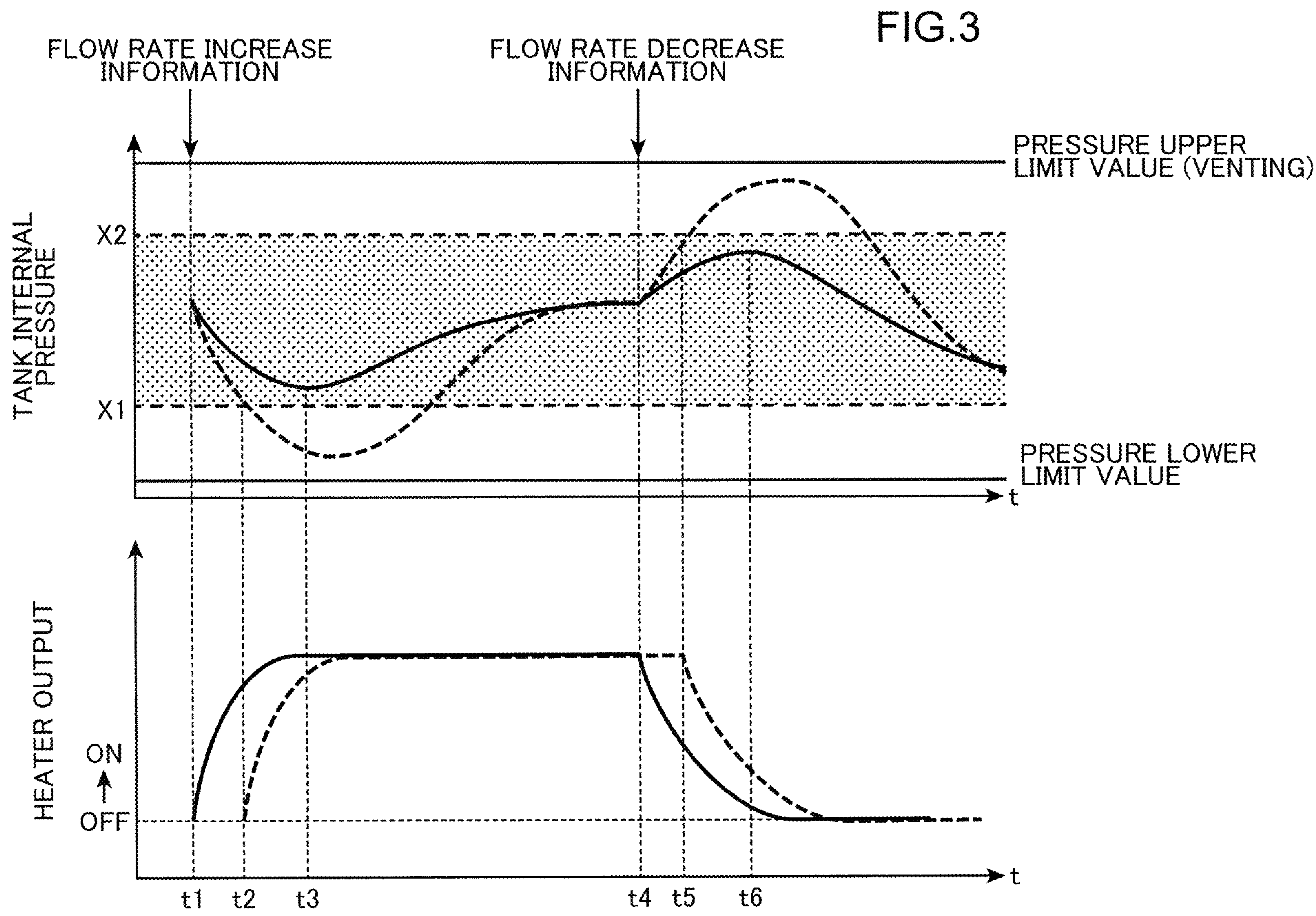
FIG. 3 is a time chart showing a chronological change in parameters seen in a control of adjusting an internal pressure of a fuel tank.

FIG. 3 is a time chart for explaining a content of each of the first and second controls. An upper section of the chart in FIG. 3 shows a chronological change in the tank internal pressure, and a lower section of the chart shows a chronological change in a heater output. First, the first control will be described with reference to the chart in FIG. 3. In the first control, it is seen from the solid waveform in the lower section of the chart that the heater 31 is turned ON at a time t1 to start the electric supply to the heater 31, and thereafter, the heater 31 is turned OFF to suspend the electric supply to the heater 31 at a time t4. At the time t1, flow rate increase information indicating an increase in the flow rate of the liquefied hydrogen LH to be discharged from the fuel tank 2 to the engine 102 is input from the FADEC 71 into the tank internal pressure controller 73. At the time t4, flow rate decrease information indicating a decrease in the flow rate of the liquefied hydrogen LH to be discharged from the fuel tank 2 to the engine 102 is input from the FADEC 71 into the tank internal pressure controller 73.

The flow rate increase information and the flow rate decrease information is output from the FADEC 71 on the basis of estimation of a change in the output of the engine 102. For instance, the FADEC 71 estimates an increase in a discharge flow rate of the liquefied hydrogen LH from the fuel tank 2 in response to at least one of a manipulation of raising the machine body 101 and a manipulation of increasing the output or rotational speed of the engine 102 to the manipulation device 103, and transmits the flow rate increase information to the tank internal pressure controller 73. By contrast, the FADEC 71 estimates a decrease in the discharge flow rate of the liquefied hydrogen LH from the fuel tank 2 in response to at least one of a manipulation of releasing the raising of the machine body 101 and a manipulation of decreasing the output of the engine to the manipulation device 103, and transmits the flow rate decrease information to the tank internal pressure controller 73. The flow rate increase information and the flow rate decrease information may not be based on such a manipulation situation of the manipulation device 103. The flow rate increase information and the flow rate decrease information may be based on, for example, a signal sent from the FADEC 71 to the flow rate regulating valve 9.

In response to the input of the flow rate increase information at the time t1 in FIG. 3, the tank internal pressure controller 73 switches the heater 31 from an "OFF" state to an "ON" state. Accordingly, the temperature of the heater 31 rises to encourage the liquefied hydrogen LH in the fuel tank 2 to evaporate or vaporize. However, it takes time to actually encourage the evaporation. Hence, an effect of a decrease in the tank internal pressure accompanied by an increase in the discharge amount of the liquefied hydrogen LH from the fuel tank 2 is greater than an effect of an increase in the tank internal pressure accompanied by the evaporation of the liquefied hydrogen LH for a certain period from the time t1. This is seen in the upper section of the chart in FIG. 3 showing a continuous decrease in the tank internal pressure for a period from the time t1 to a time t3. By contrast, at the time t3 and thereafter, the effect accompanied by the evaporation of the liquefied hydrogen LH is prominently observed, and the tank internal pressure starts to increase.

In response to the input of the flow rate decrease information at the time t4 in a delay from the time t3, the tank internal pressure controller 73 switches the heater 31 from the "ON" state to the "OFF" state. Accordingly, the temperature of the heater 31 is lowered and the liquefied hydrogen LH is less likely to evaporate. This provides an operational effect of suppressing an increase in the tank internal pressure in conjunction with a decrease in the flow rate of the liquefied hydrogen LH. However, the tank internal pressure increases due to residual heat of the heater 31 for a certain period from the time t4. This is seen in the upper section of the chart in FIG. 3 showing a continuous increase in the tank internal pressure for a period from the time t4 to a time t6. By contrast, at the time t6 and thereafter, the effect of the decrease in the tank internal pressure accompanied by the discharge of the liquefied hydrogen LH from the fuel tank 2 becomes greater than the effect of the increase in the tank internal pressure due to the residual heat. Thus, the tank internal pressure starts to decrease.

As described above, in the first control, the tank internal pressure controller 73 controls the heater 31 on the basis of the input information from the FADEC 71. However, for instance, a signal from the FADEC 71 may be lost for some reason. The second control takes such a situation into consideration. The second control includes controlling the heater 31 to be turned ON/OFF on the basis of the input information from the pressure sensor SN1 instead of the input information from the FADEC 71.

In the second control, it is seen from the dashed waveform in the lower section of the chart in FIG. 3 that the heater 31 is turned ON at the time t2 and the heater 31 is turned OFF at a time t5 thereafter. It is seen from the dashed waveform in the upper section in FIG. 3 that a detection value of the tank internal pressure from the pressure sensor SN1 falls below a predetermined first threshold X1 at the time t2, and the detection value of the tank internal pressure exceeds a predetermined second threshold X2 at the time t5.

The first threshold X1 is set to a value which is greater than a lower limit value of the tank internal pressure. The lower limit value of the tank internal pressure represents a lower limit value for ensuring a normal discharge operation of the pump 5. When the tank internal pressure falls below the lower limit value, a pressure of the liquefied hydrogen LH to enter the pump 5 from the fuel tank 2, i.e., the inlet pressure of the pump 5, excessively decreases. This may result in an unstable operation of discharging the liquefied hydrogen LH by the pump 5. Here, the first threshold X1 is set to a level which is higher than the level of the lower limit value so that the heater 31 is turned ON before the tank internal pressure decreases to reach the lower limit value.

The second threshold X2 is set to a value which is greater than the first threshold X1 and smaller than an upper limit value of the tank internal pressure. The upper limit value of the tank internal pressure represents a pressure at which the internal pressure control valve 62 of the pressure limiting mechanism 6 opens, that is, a pressure at which the hydrogen gas is compulsorily vented from the fuel tank 2. The second threshold X2 is set to a level which is lower than the level of the upper limit value so that the heater 31 is turned OFF before the tank internal pressure increases to reach the upper limit value.

As shown in FIG. 3, the tank internal pressure controller 73 switches the heater 31 from the "OFF" state to the "ON" state at the time t2 at which a detection value of the tank internal pressure falls below the first threshold X1. The switching of the heater 31 to the "ON" state results in raising the temperature of the heater 31 and accordingly encouraging the liquefied hydrogen LH to evaporate. In this manner, the tank internal pressure starts to increase after a some delay time.

At the time t5 after the tank internal pressure starts to increase, the detection value of the tank internal pressure exceeds the second threshold X2. In response to this, the tank internal pressure controller 73 switches the heater 31 from the "ON" state to the "OFF" state. The switching of the heater 31 to the "OFF" state results in lowering the temperature of the heater 31 and accordingly suppressing the evaporation of the liquefied hydrogen LH. In this manner, the tank internal pressure starts to decrease after a some delay time.

As described above, in the second control, the tank internal pressure controller 73 controls the heater 31 on the basis of the detection value of the tank internal pressure from the pressure sensor SN1. Hence, a time for controlling the heater 31 in the second control is later than a time for controlling the heater in the first control on the basis of the input information from the FADEC 71. Specifically, the time t2 being a time at which the heater 31 is turned ON in the second control is later than the time t1 being a time at which the heater 31 is turned ON in the first control. The time t5 being a time at which the heater 31 is turned OFF in the second control is later than the time t4 being a time at which the heater 31 is turned OFF in the first control. The dashed waveform lies below the solid waveform from the time t1 to the time t3 in the upper section of the chart in FIG. 3, and a difference between the solid waveform and the dashed waveform increases. This shows that a pressure decrease speed is faster in the second control than in the first control due to slower heating of the heater 31 in the second control than heating thereof in the first control. Further, at the time t3 and thereafter in the upper section of the chart in FIG. 3, a time corresponding to the trough of the dashed waveform is later than the time, i.e., time t3, corresponding to the trough of the solid waveform. This shows that a pressurization time is later in the second control than in the first control due to the slower heating of the heater 31 in the second control than the heating thereof in the first control.

Here, at least a part of the heaters 31 may be exposed from a liquid surface of the liquefied hydrogen LH in the fuel tank 2 depending on a posture of the machine body 101. For instance, when the machine body 101 largely tilts, an angle difference between the bottom surface of the fuel tank 2 and the liquid surface of the liquefied hydrogen LH may increase and a part of the heaters 31 may be exposed from the liquid surface. A temperature of a specific heater 31 exposed from the liquid surface is more likely to rise than the temperature of another heater 31 immersed in the liquefied hydrogen LH. In other words, the exposure of the heater 31 from the liquid surface is regarded to show a heat abnormality indicating an abnormal temperature rise in the heater 31. Hereinafter, controlling for an occurrence of the heat abnormality will be described.

In operation of each engine 102, the tank internal pressure controller 73 determines, on the basis of the input information from the temperature sensors SN2 respectively provided to the heaters 31, an existence or absence of the heat abnormality indicating an abnormal temperature rise in the heaters 31. When the heat abnormality is confirmed to occur in a specific heater 31, the tank internal pressure controller 73 stops or suspends the electric supply to the heater 31 in which the heat abnormality occurs to turn OFF the heater 31. In other words, the electric supply is stopped to lower the temperature of the heater 31 and accordingly solve the heat abnormality in the heater 31.

When the heat abnormality is confirmed to occur in the heater 31, the tank internal pressure controller 73 executes a control of increasing an output, i.e., an electric supply amount, of another heater 31 in which no heat abnormality occurs in cooperation with the control of turning OFF the heater 31 in which the heat abnormality occurs. The control raises the temperature of another heater 31 immersed in the liquefied hydrogen LH to encourage the liquefied hydrogen LH to evaporate. This serves to maintain an effect of increasing the tank internal pressure owing to the evaporation of the liquefied hydrogen LH by compensating a decrease in the heating amount attributed to the exposure of a part of heaters 31 from the liquid surface of the liquefied hydrogen LH.

3. Operational Effects

As described heretofore, in the embodiment, each of the heaters 31, i.e., pressure increasing mechanism 3, in the fuel tank 2 is controlled on the basis of a flow rate of the liquefied hydrogen LH in operation of each engine 102 in which the liquefied hydrogen LH in the fuel tank 2 is discharged by the pump 5, so that the tank internal pressure being a pressure in the inner part of the fuel tank 2 is adjusted. For instance, in response to an input of flow rate increase information indicating an increase in the flow rate of the liquefied hydrogen LH from the FADEC 71, the tank internal pressure controller 73 raises the temperature of the heater 31 to increase the tank internal pressure. This configuration enables stabilization of the inlet pressure of the pump 5 and an accurate supply of a required amount of the liquefied hydrogen LH to the engine 102.

Specifically, in the embodiment, at an increase in the flow rate of the liquefied hydrogen LH, that is, in a situation where a speed of increase in the volume of the gaseous phase 2$a$ in the fuel tank 2 is accelerated, the heating by the heater 31 encourages the liquefied hydrogen LH to evaporate. Hence, the pressure increase effect provided by the evaporated hydrogen, i.e., hydrogen gas, can compensate a decrease in the tank internal pressure accompanied by the increase in the volume of the gaseous phase 2$a$. This allows the tank internal pressure to fall within a predetermined range regardless of a change in the flow rate of the liquefied hydrogen LH. Thus, this enables stabilization of the inlet pressure of the pump 5. The stabilization of the inlet pressure of the pump 5 leads to easier agreement between a discharge amount of the liquefied hydrogen LH by the pump 5 and a target amount thereof, resulting in an achievement of an accurate supply of the required amount of the liquefied hydrogen LH to the engine 102 in accordance with an operation condition of the engine 102.

By contrast, in response to an input of flow rate decrease information indicating a decrease in the flow rate of the liquefied hydrogen LH from the FADEC 71, the tank internal pressure controller 73 lowers the temperature of the heater 31 to suppress an increase in the tank internal pressure. This configuration succeeds in avoiding continuous heating by the heater 31 in a situation where the speed of increase in the volume of the gaseous phase 2*a* is decelerated. This prevents the tank internal pressure from excessively increasing.

In the embodiment, the pressure sensor SN1 that detects the tank internal pressure is attached to the fuel tank 2. Also, the control of raising the temperature of the heater 31 to increase the tank internal pressure is executed when a pressure detected by the pressure sensor SN1 falls below the first threshold X1. By contrast, the control of lowering the temperature of the heater 31 to suppress an increase in the tank internal pressure is executed when the pressure detected by the pressure sensor SN1 exceeds the second threshold X2 which is greater than the first threshold X1. This configuration enables the stabilization of the inlet pressure of the pump 5 under the control of the heater 31 based on the actual tank internal pressure even when a signal from the FADEC 71 is lost, that is, even when information about the flow rate of the liquefied hydrogen is unavailable, for some reason.

In the embodiment, it is checked whether a heat abnormality indicating an abnormal temperature rise occurs in each of the heaters 31 in the operation of the engine 102 in which the tank internal pressure is adjusted by using the heaters 31 as described above. When the heat abnormality is confirmed to occur in a specific heater 31, the control of stopping the heater 31 in which the heat abnormality occurs and increasing the output of another heater 31 is executed. In the case where a part of the heaters 31 is exposed from the liquid surface of the liquefied hydrogen LH depending on, for example, a change in the posture of the machine body 101, this configuration can solve a heat abnormality which may occur in the heater 31 due to the change in the posture. Besides, the increasing of the output of another heater 31 in which no heat abnormality occurs succeeds in compensating a decrease in a heat amount attributed to the exposure of the part of heaters 31 from the liquid surface of the liquefied hydrogen LH. Thus, this maintains the pressure increase effect of the tank internal pressure owing to the evaporation of the liquefied hydrogen LH.

4. Modifications

Although the engine 102 formed of a hydrogen turbine engine is used as a propulsion device that gives a propulsive force to the machine body 101 in the first embodiment, the propulsion device is not limited to such an engine as long as the device produces a propulsive force by using hydrogen as an energy source. For instance, a fuel cell system may be adopted as the propulsion device. The fuel cell system may include, for example, an electricity generation part that generates electric power through chemical reaction between hydrogen and oxygen, a power storage part that stores the electric power generated in the electricity generation part, and a motor that drives a turbine or a propeller to rotate with the electric power supplied from the power storage part. The fuel supply system in the disclosure is adaptable to supply liquefied hydrogen to the electricity generation part in the fuel cell system.

Although the pressure increasing mechanism 3 including the heaters 31 in the fuel tank 2 is provided to increase a tank internal pressure being a pressure in the inner part, i.e., the gaseous phase 2*a*, of the fuel tank 2 in the first embodiment, the pressure increasing mechanism may include at least one heater. In other words, the number of heaters to be arranged in the tank may be one, or two or more. Further, the shape of each heater 31 is not particularly limited. The heater 31 may have a sheet-like shape or a shape which is long in a longitudinal direction thereof.

Further, the heater is not necessarily arranged in the fuel tank and may be arranged outside the fuel tank. For instance, a circulation line may be provided to guide liquefied hydrogen out of a fuel tank and return the liquefied hydrogen to the fuel tank, and the circulation line may be provided with the heater.

Moreover, another element may be adopted as a pressure increasing mechanism in place of the heater. For instance, an accumulator that stores hydrogen gas having a high pressure may be provided independently of a fuel tank, and the accumulator may supply hydrogen gas therefrom to the fuel tank in a situation where a discharge flow rate of the liquefied hydrogen from the fuel tank increases, that is, in a situation where a tank internal pressure decreases. Even this configuration enables stabilization of an inlet pressure of a pump by making the tank internal pressure fall within a predetermined range.

The pressure increasing mechanism may be controlled to adjust the tank internal pressure on the basis of any information of information about an output of the engine 102, information about a flow rate of the liquefied hydrogen LH discharged from the fuel tank 2 to the engine 102, and information about a manipulation to the manipulation device 103. The information about the output of the engine 102 is acquirable from a control signal of the engine 102 output from the controller 7. The information about the flow rate of the liquefied hydrogen LH discharged from the fuel tank 2 to the engine 102 is acquirable from a control signal sent to the flow rate regulating valve 9 or a value from a flow rate sensor provided in the fuel supply pipe 4. The information about the manipulation to the manipulation device 103 is acquirable from a value from a sensor attached to the manipulation device 103 or a value from a sensor incorporated in the manipulation device 103.

Although the pressure limiting mechanism 6 is provided to make the hydrogen gas in the gaseous phase 2*a* in the fuel tank 2 flow out to the outside air in the first embodiment, the pressure limiting mechanism may make a collector collect the pressure flowing out of the gaseous phase 2*a*.

Second Embodiment

Figure 4:
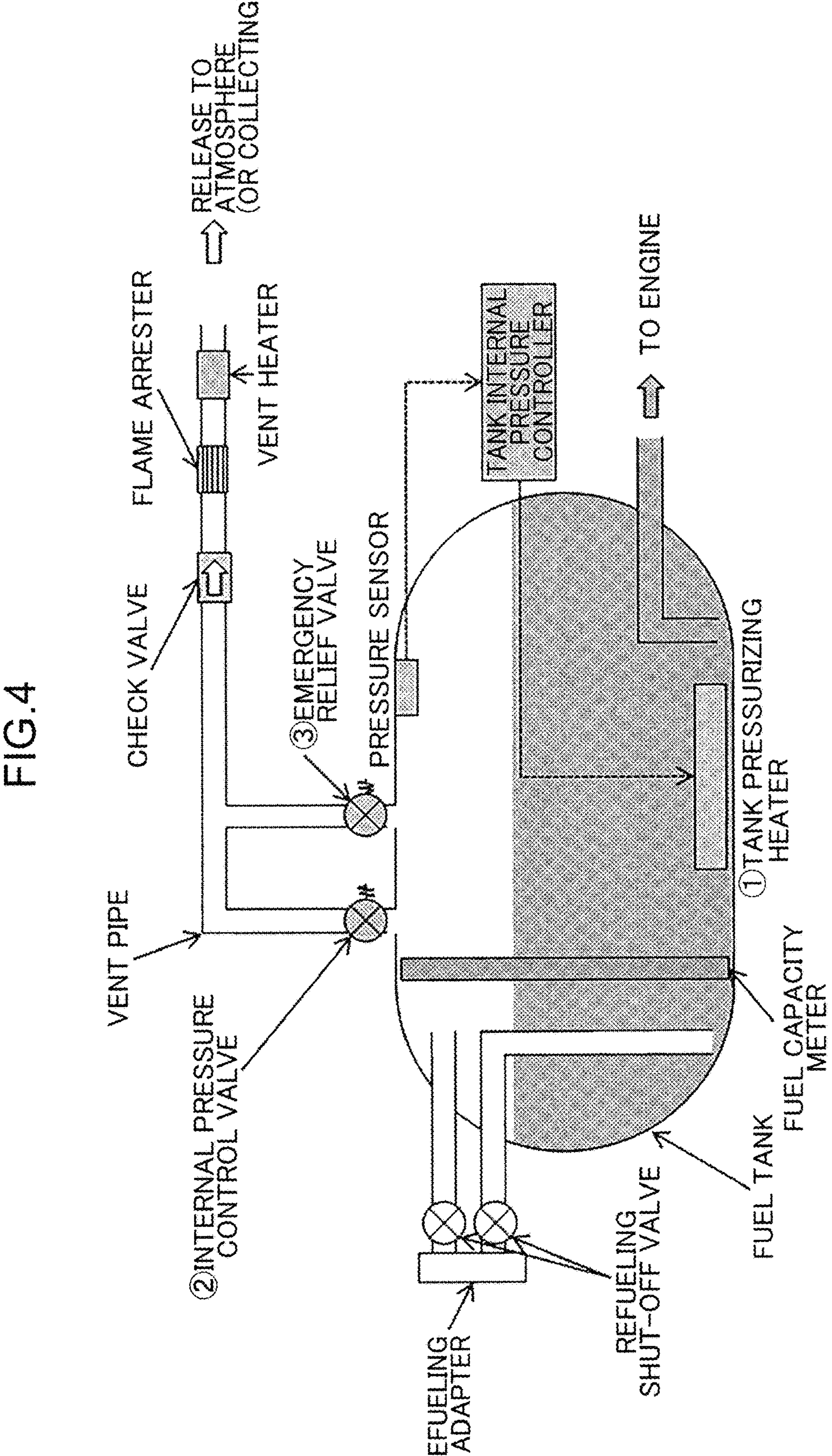
FIG. 4 is a diagram showing a fuel supply system according to a second embodiment of the disclosure.

Hereinafter, a second embodiment of the present disclosure will be described. FIG. 4 is a diagram showing a fuel supply system for a hydrogen-powered aircraft according to the second embodiment of the disclosure.

1. Control System (1) A controller monitors a tank internal pressure detected by a pressure sensor, and the controller controls an opening degree of an electric internal pressure control valve and a heating time by a tank pressurizing heater or a pressurization time by an accumulator to give a constant pressure in the tank. The controlling to the constant pressure leads to acquisition of a constant pump inlet pressure and a stabilized pump discharge pressure.

(2) The tank is controlled to have the constant pressure therein in accordance with an operation state of an engine regardless of a change in a pump transfer amount.

(3) A tank internal pressure controller receives data about a state of each of the engine and the pump and about a fuel amount from an engine control unit to perform a tank internal pressure control and a fault diagnosis.

(4) The tank internal pressure controller monitors the fuel amount in the tank. Further, an appropriately corrected capacity is displayed in response to a machine body posture signal even when a change is seen in a liquid surface.

2. Components (1) One or more tank pressurizing heaters are adopted. More tank pressurizing heaters more reliably ensure redundancy.

(2) The pump may be arranged inside or outside a tank. In the outside arrangement in consideration of maintainability, an impeller may be arranged inside the tank and a motor may be arranged outside the tank. That is to say, the arrangement enables replacement of only the motor which is likely to be damaged without removing the liquefied hydrogen from the tank.

(3) Each of an internal pressure control valve and an emergency relief valve is aimed at working on the ground and at a high altitude. The internal pressure control valve and the emergency relief valve may be activated under either an absolute pressure or a gauge pressure as a working pressure. Each valve may be of either a mechanical type or an electric type.

3. Arrangement (1) The tank pressurizing heater is located away from a fuel capacity meter and the pump in such a manner as to avoid an influence of vaporization of the hydrogen in operation of the tank pressurizing heater.

4. Energy Reduction (1) Heating by the pump or other components in place of the tank pressurizing heater makes liquefied hydrogen vaporize or boil off to increase the pressure in the tank and reduce electric power of the tank pressurizing heater.

(2) Returning of a part of pressurized liquefied hydrogen at a downstream position of the pump to the tank increases the tank internal pressure and reduces the electric power of the tank pressurizing heater.

As shown in FIG. 1, the tank internal pressure controller controls the tank pressurizing heater and the internal pressure control valve along with a decrease in the pressure accompanied by a supply of the fuel to the engine to increase or decrease the pressure in the tank, so that the tank internal pressure is kept at a desired target value. The emergency relief valve is further provided to prevent a pressure in the tank from increasing to exceed a predetermined value in emergency/parking.

Third Embodiment

Figure 5:
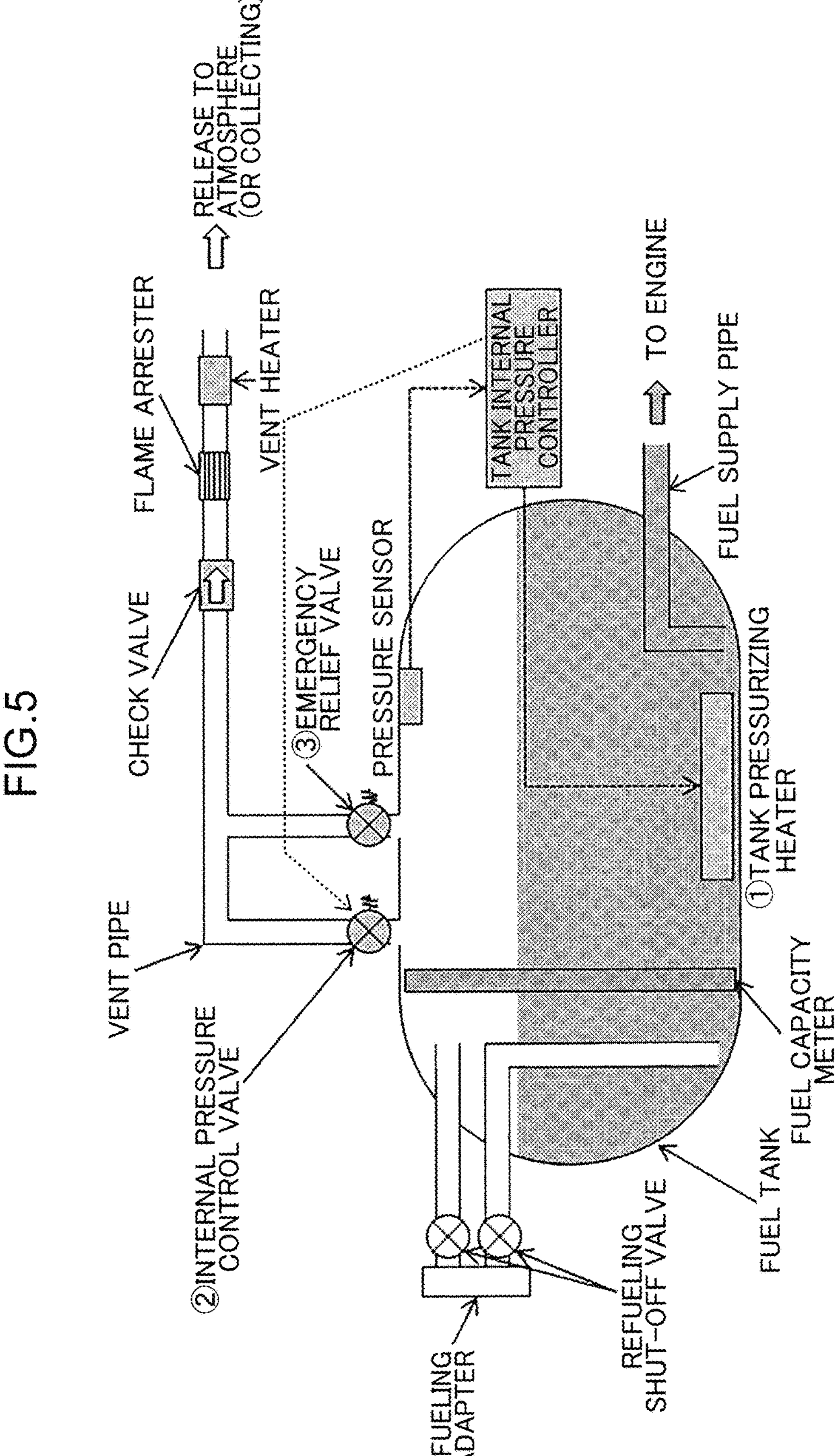
FIG. 5 is a diagram showing a fuel supply system according to a third embodiment of the disclosure.

Hereinafter, a third embodiment of the present disclosure will be described. FIG. 5 is a diagram showing a fuel supply system for a hydrogen-powered aircraft according to the third embodiment of the disclosure. The expression "signally connected" in the description means wired or wireless connection among devices to send and receive electric signals for transmitting information.

1. Components (1) Fuel Tank

A fuel tank stores liquefied hydrogen therein. The fuel tank is made of metal, such as aluminum, or formed of a composite member including CFRP, GFRP, or the like. The fuel tank shown in FIG. 2 has opposite ends each having a hemispherical shape and an intermediate portion having a cylindrical shape. However, the shape is not limited thereto as long as the shape is suitable for maintaining a high pressure.

(2) Tank Internal Pressure Controller

A tank internal pressure controller controls an internal pressure of the fuel tank to have a desired value or to fall within a desired range by receiving and sending control signals from and to the components of the fuel supply system. The tank internal pressure controller includes a processor and a memory. The memory in the tank internal pressure controller stores a program for obtaining a desired control result and various kinds of data or various thresholds to be used in the program. The processor executes the program stored in the memory.

(3) Fuel Supply Pipe

A fuel supply pipe supplies liquefied hydrogen stored in the fuel tank to an engine. The fuel supply pipe has one end in the fuel tank and another end connected to the engine. The fuel supply pipe may include a returning pipe for returning a part of pressurized liquefied hydrogen at a downstream position of the pump to the tank. The returning pipe may be provided with a flow rate control valve that controls a return amount of the liquefied hydrogen, and the flow rate control valve may be signally connected to the tank internal pressure controller.

(4) Pump

The pump is connected to the fuel supply pipe to allow the liquefied hydrogen to flow through the fuel supply pipe. The pump is signally connected to the tank internal pressure controller. The pump may be provided inside the fuel tank or outside the fuel tank. Besides, a part of the pump may be arranged inside the fuel tank and another part of the pump may be arranged outside the fuel tank. In the arrangement of the pump inside the fuel tank, heat generated in activation of the pump to be described later is utilized to heat a liquefied hydrogen fuel material for increasing the pressure in the fuel tank. The arrangement of the pump outside the fuel tank facilitates the maintenance of the pump. In use of a pump having an impeller and a motor, the impeller may be arranged inside the fuel tank and the motor that requires high necessity of maintenance may be arranged outside the fuel tank. Such arrangement enables replacement of the motor without removing the liquefied hydrogen from the fuel tank. In this case, the pump penetrates the wall of the fuel tank, and hence, a gap between the pump and a wall of the fuel tank is sealed to avoid a leakage of the liquefied hydrogen.

(5) Tank Pressure Increasing Heater

A tank pressurizing heater is provided in the fuel tank to increase an internal pressure of the fuel tank. The tank pressurizing heater is signally connected to the tank internal pressure controller. The tank pressurizing heater is activated to heat and vaporize a part of the liquefied hydrogen in the fuel tank, and accordingly, a volume of the liquefied hydrogen increases. This results in increasing the internal pressure of the fuel tank. The tank pressurizing heater may be provided at a position where the liquefied hydrogen exists or a position where no liquefied hydrogen exists in the fuel tank. The tank pressurizing heater may be provided at the bottom of the fuel tank. In a case where the fuel tank has an intermediate portion in a cylindrical shape as shown in FIG. 2, the tank pressurizing heater may be provided in a bottom portion thereof in the cylindrical shape. Such arrangement of the tank pressurizing heater at a lower position leads to a success in heating the liquefied hydrogen regardless of a storage amount of the liquefied hydrogen in the fuel tank. More tank pressurizing heaters may be provided to ensure redundancy. Each tank pressurizing heater is located away from a fuel capacity meter and the pump in the arrangement of the pump inside the fuel tank to avoid an influence of vaporization of the hydrogen in activation of the tank pressurizing heater. For instance, the fuel capacity meter and the pump may be arranged in such a manner as not to come above the tank pressurizing heater, or the fuel capacity meter and the pump may be arranged outside a region where hydrogen vaporized by the tank pressurizing heater moves upward in the liquefied hydrogen, i.e., a region where gaseous hydrogen exists.

(6) Internal Pressure Control Valve

An internal pressure control valve opens and closes in response to a signal from the tank internal pressure controller. Opening the internal pressure control valve makes the internal pressure of the fuel tank approach the atmospheric pressure. Generally, the internal pressure of the fuel tank decreases. The internal pressure control valve is selected to work on the ground and at a high altitude. The internal pressure control valve may work under either an absolute pressure or a gauge pressure, and may be of either a mechanical type or an electric type.

(7) Emergency Relief Valve

An emergency relief valve maintains an internal pressure of the fuel tank within a safe range. The emergency relief valve opens when the internal pressure of the fuel tank exceeds a predetermined threshold to decrease the pressure in the fuel tank.

(8) Pressure Sensor

A pressure sensor detects the internal pressure of the fuel tank and is signally connected to the tank internal pressure controller. The pressure sensor is provided in a region or a gaseous phase containing no liquefied hydrogen in the fuel tank. The pressure sensor may be provided at a position higher than a limit position where the liquefied hydrogen exists in the fuel tank. In a case where the fuel tank has a mechanism that keeps the amount of the liquefied hydrogen in the fuel tank from reaching an upper limit value or larger, the pressure sensor may be provided at a position higher than an upper limit position where the liquefied hydrogen having the amount of the upper limit is likely to be in at least a steady state, such as a parking state or horizontally flying state, of the aircraft. Arrangement of the pressure sensor is not limited to the position, and the pressure sensor may be arranged at, for example, a certain position of a pipe extending from the fuel tank and connected to the emergency relief valve.

(9) Fuel Capacitor Meter

A fuel capacitor meter detects a storage amount of the liquefied hydrogen stored in the fuel tank.

(10) Accumulator

An accumulator increases an internal pressure of the fuel tank and is connected to the fuel tank to allow a fluid to flow in the fuel tank. The accumulator is signally connected to the tank internal pressure controller.

(11) Engine Control Unit

An engine control unit (FEDEC) controls the engine and is signally connected to the tank internal pressure controller.

2. Control

Purpose of Control

Controlling the internal pressure of the tank to have a predetermined value or fall within a predetermined range allows a pump inlet pressure to have a predetermined value or fall within a predetermined range, resulting in acquisition of a stable pump discharge pressure.

Ways of Control

Hereinafter, ways of control will be described. The program may include all the ways described below or may include a part of the ways.

(1) In adoption of an electric internal pressure control valve, the tank internal pressure controller reads out a detection value from the pressure sensor. When the detection value is larger than a predetermined value, the tank internal pressure controller sends a signal to the internal pressure control valve to open the valve.

(2) When the tank internal pressure controller reads out a detection value from the pressure sensor and the detection value therefrom is smaller than a predetermined value, the tank internal pressure controller sends a signal to the tank pressurizing heater to heat the liquefied hydrogen. The tank internal pressure controller controls a heating time of the tank pressurizing heater. In a case where the tank pressurizing heater has a heating temperature adjusting function, the tank internal pressure controller may control the heating temperature of the tank pressurizing heater.

(3) When the tank internal pressure controller reads out a detection value from the pressure sensor and the detection value therefrom is smaller than a predetermined value, the tank internal pressure controller sends a signal to the accumulator to increase the pressure of the liquefied hydrogen. The tank internal pressure controller controls a pressurization time of the accumulator.

(4) The tank internal pressure controller may receive a signal about an operation state, such as an output degree, of an engine from the engine, and may control the internal pressure control valve, the tank pressurizing heater, and the accumulator on the basis of the signal. This configuration succeeds in controlling the internal pressure of the fuel tank with a higher accuracy even when a pump transfer amount changes in accordance with the operation state of the engine. Specifically, when the pump transfer amount changes in accordance with the operation state of the engine, a speed of reduction in the liquefied hydrogen in the fuel tank also changes, and a fluctuation in the internal pressure of the fuel tank accompanied by the reduction in the liquefied hydrogen may have a negative influence on the control. However, this configuration can avoid the negative influence. The signal about the operation state may be obtained from the engine control unit or may be obtained from detection values from various sensors included in the aircraft.

(5) A tank internal pressure controller receives data about a state of each of the engine and the pump and about a fuel amount from an engine control unit to perform an internal pressure control of the fuel tank and a fault diagnosis.

(6) The tank internal pressure controller may read out a detection value from a fuel capacity meter and control the internal pressure control valve, the tank pressurizing heater, and the accumulator on the basis of the detection value. A liquid surface position of the liquefied hydrogen in the fuel tank changes depending on a posture of the machine body, and thus, the tank internal pressure controller may modify the detection value from the fuel capacity meter on the basis of machine body posture information. The machine body posture information is obtainable from detection values from various sensors included in the aircraft.

The invention claimed is:

1. A fuel supply system for a hydrogen-powered aircraft including a propulsion device that uses hydrogen as an energy source, the fuel supply system comprising:

a fuel tank that stores liquefied hydrogen;

a pump that discharges the liquefied hydrogen from the fuel tank to supply the liquefied hydrogen to the propulsion device;

a pressure increasing mechanism that increases a tank internal pressure being a pressure in an inner part of the fuel tank, the pressure increasing mechanism including a heater arranged in the fuel tank;

a flow rate controller that controls a flow rate of the liquefied hydrogen to be supplied from the fuel tank to the propulsion device; and a pressure controller that controls the pressure increasing mechanism to adjust the tank internal pressure based on the flow rate of the liquefied hydrogen input from the flow rate controller, wherein an increase or decrease in a discharge flow rate of liquefied hydrogen from the fuel tank is estimated in response to an input to a manipulation device, and flow rate increase information or flow rate decrease information is transmitted to the pressure controller, and the pressure controller controls the heater, based on the flow rate increase information or the flow rate decrease information.

2. The fuel supply system for a hydrogen-powered aircraft according to claim 1, wherein the pressure increasing mechanism includes a plurality of heaters, including the heater, arranged apart from each other in the fuel tank.

3. The fuel supply system for a hydrogen-powered aircraft according to claim 2, further comprising temperature sensors that detect respective temperatures of the heaters, wherein the pressure controller determines, on the basis of input information from the temperature sensors, an existence or absence of a heat abnormality indicating an abnormal temperature rise in the heaters, and, when the heat abnormality is confirmed to occur in a specific heater, stops the specific heater in which the heat abnormality occurs and increases an output of another heater.

4. The fuel supply system for a hydrogen-powered aircraft according to claim 1, wherein the pressure controller increases the tank internal pressure by raising the temperature of the heater when receiving information indicating an increase in the flow rate of the liquefied hydrogen from the flow rate controller.

5. The fuel supply system for a hydrogen-powered aircraft according to claim 4, wherein the pressure controller suppresses an increase in the tank internal pressure by lowering the temperature of the heater when receiving information indicating a decrease in the flow rate of the liquefied hydrogen from the flow rate controller.

6. The fuel supply system for a hydrogen-powered aircraft according to claim 1, further comprising a pressure sensor that detects the tank internal pressure, wherein the pressure controller increases the tank internal pressure by raising the temperature of the heater when the tank internal pressure detected by the pressure sensor falls below a predetermined first threshold.

7. The fuel supply system for a hydrogen-powered aircraft according to claim 6, wherein the pressure controller suppresses an increase in the tank internal pressure by lowering the temperature of the heater when the tank internal pressure detected by the pressure sensor exceeds a second threshold which is greater than the first threshold.

8. A method of adjusting a tank internal pressure for a hydrogen-powered aircraft which includes:

a propulsion device that uses hydrogen as an energy source;

a fuel tank that stores liquefied hydrogen;

a pump that discharges the liquefied hydrogen from the fuel tank to supply the liquefied hydrogen to the propulsion device;

a pressure increasing mechanism that increases a tank internal pressure being a pressure in an inner part of the fuel tank, the pressure increasing mechanism including a heater arranged in the fuel tank; and a manipulation device that receives a manipulation to the hydrogen-powered aircraft, the method comprising controlling the pressure increasing mechanism to adjust the tank internal pressure on the basis of any information of information about an output of the propulsion device, information about a flow rate of the liquefied hydrogen discharged from the fuel tank to the propulsion device, and information about the manipulation to the manipulation device;

estimating an increase or decrease in a discharge flow rate of liquefied hydrogen from the fuel tank in response to an input to a manipulation device and transmitting flow rate increase information or flow rate decrease information is transmitted to the pressure controller, and controlling, by the pressure controller, the heater, based on the flow rate increase information or the flow rate decrease information.

9. The method according to claim 8, wherein the pressure increasing mechanism includes a plurality of heaters, including the heater, arranged apart from each other in the fuel tank.

10. The method according to claim 9, wherein the hydrogen-powered aircraft further includes temperature sensors that detect respective temperatures of the heaters, determining, by the pressure controller, on the basis of input information from the temperature sensors, an existence or absence of a heat abnormality indicating an abnormal temperature rise in the heaters, and, when the heat abnormality is confirmed to occur in a specific heater, stops the specific heater in which the heat abnormality occurs and increases an output of another heater.

11. The method according to claim 8, wherein the pressure controller increases the tank internal pressure by raising the temperature of the heater when receiving information indicating an increase in the flow rate of the liquefied hydrogen from the flow rate controller.

12. The method according to claim 8, wherein the pressure controller suppresses an increase in the tank internal pressure by lowering the temperature of the heater when receiving information indicating a decrease in the flow rate of the liquefied hydrogen from the flow rate controller.

13. The method according to claim 8, further comprising a pressure sensor that detects the tank internal pressure, wherein the pressure controller increases the tank internal pressure by raising the temperature of the heater when the tank internal pressure detected by the pressure sensor falls below a predetermined first threshold.

14. The method according to claim 8, wherein the pressure controller suppresses an increase in the tank internal pressure by lowering the temperature of the heater when the tank internal pressure detected by the pressure sensor exceeds a second threshold which is greater than the first threshold.

15. The method according to claim 8, wherein the flow rate controller is a full authority digital engine control that is signally connected to the propulsion device to control an operation of the propulsion device, and wherein the method further comprises controlling, by the flow rate controller, an opening degree of a flow rate regulating valve arranged in a fuel supply pipe connecting the fuel tank and the propulsion device to control the flow rate of the liquefied hydrogen.

16. The method according to claim 15, wherein the flow rate controller is further signally connected to a manipulation device that receives a manipulation to the hydrogen-powered aircraft, and wherein the method further comprises, by the flow rate controller, estimating the flow rate of the liquefied hydrogen based on at least one of a manipulation signal from the manipulation device and an operation state of the propulsion device.

17. The fuel supply system according to claim 1, further comprising a fuel supply pipe that supplies the liquefied hydrogen from the fuel tank to the propulsion device, wherein the fuel supply pipe includes a returning pipe that returns a part of pressurized liquefied hydrogen at a downstream position of the pump to the fuel tank, the returning pipe being provided with a flow rate control valve that controls a return amount of the liquefied hydrogen.

18. The fuel supply system according to claim 1, wherein the flow rate controller is a full authority digital engine control that is signally connected to the propulsion device to control an operation of the propulsion device, and controls an opening degree of a flow rate regulating valve arranged in a fuel supply pipe connecting the fuel tank and the propulsion device to control the flow rate of the liquefied hydrogen.

19. The fuel supply system according to claim 1, wherein the flow rate controller is further signally connected to a manipulation device that receives a manipulation to the hydrogen-powered aircraft, and wherein the flow rate controller estimates the flow rate of the liquefied hydrogen based on at least one of a manipulation signal from the manipulation device and an operation state of the propulsion device.

* * * * *